US006497975B2

(12) United States Patent
Bostaph et al.

(10) Patent No.: US 6,497,975 B2
(45) Date of Patent: Dec. 24, 2002

(54) DIRECT METHANOL FUEL CELL INCLUDING INTEGRATED FLOW FIELD AND METHOD OF FABRICATION

(75) Inventors: Joseph W. Bostaph, Chandler, AZ (US); Chowdary R. Koripella, Scottsdale, AZ (US); Allison M. Fisher, Chandler, AZ (US); Jay K. Neutzler, Santa Fe, NM (US)

(73) Assignee: Motorola, Inc., Schaumburg, IL (US)

( * ) Notice: Subject to any disclaimer, the term of this patent is extended or adjusted under 35 U.S.C. 154(b) by 153 days.

(21) Appl. No.: 09/738,126

(22) Filed: Dec. 15, 2000

(65) Prior Publication Data

US 2002/0076598 A1 Jun. 20, 2002

(51) Int. Cl.[7] ........................ H01M 8/02; H01M 8/04; H01M 8/10
(52) U.S. Cl. .................... 429/38; 429/32; 429/34; 429/39; 429/44; 427/115
(58) Field of Search ............................. 429/30, 32, 34, 429/38, 39, 44; 29/623.1; 427/115

(56) References Cited

U.S. PATENT DOCUMENTS 6,387,559 B1 * 5/2002 Koripella et al. ............. 429/22

* cited by examiner

*Primary Examiner*—Patrick Ryan
*Assistant Examiner*—Jonathan Crepeau
(74) *Attorney, Agent, or Firm*—William E. Koch

(57) ABSTRACT

A fuel cell device and method of forming the fuel cell device including a base portion, formed of a singular body, and having a major surface. At least one fuel cell membrane electrode assembly is formed on the major surface of the base portion. A fluid supply channel including a mixing chamber is defined in the base portion and communicating with the fuel cell membrane electrode assembly for supplying a fuel-bearing fluid to the membrane electrode assembly. An exhaust channel is defined in the base portion and communicating with the membrane electrode. A multi-dimensional fuel flow field is defined in the multi-layer base portion and in communication with the fluid supply channel, the membrane electrode assembly and the exhaust channel.

18 Claims, 2 Drawing Sheets

DIRECT METHANOL FUEL CELL INCLUDING INTEGRATED FLOW FIELD AND METHOD OF FABRICATION

FIELD OF INVENTION

The present invention pertains to fuel cells, and more particularly to a direct methanol fuel cell including an integrated fuel flow field and a method of fabricating the device, in which even distribution of the fuel into the fuel cell is achieved during the process of generating electrical energy.

BACKGROUND OF THE INVENTION

Fuel cells in general, are "battery replacements", and like batteries, produce electricity through an electrochemical process without combustion. The electrochemical process utilized provides for the combining of protons with oxygen from air or as a pure gas. The process is accomplished utilizing a proton exchange membrane (PEM) sandwiched between two electrodes, namely an anode and a cathode. Fuel cells, as known, are a perpetual provider of electricity. Hydrogen is typically used as the fuel for producing the electricity and can be processed from methanol, natural gas, petroleum, or stored as pure hydrogen. Direct methanol fuel cells (DMFCs) utilize methanol, in a gaseous or liquid form as fuel, thus eliminating the need for expensive reforming operations. DMFCs provide for a simpler PEM cell system, lower weight, streamlined production, and thus lower costs.

In a standard DMFC, a dilute aqueous solution of methanol is fed as the fuel on the anode side (first electrode) and the cathode side (second electrode) is exposed to forced or ambient air (or 02). A Nafion® type proton conducting membrane typically separates the anode and the cathode sides. Several of these fuel cells can be connected in series or parallel depending on power requirements.

Typically, DMFC designs are large stacks with forced airflow operating at elevated temperatures of approximately 60–80° C. Smaller air breathing DMFC designs require the miniaturization of all the system components and are thus more complicated. In conventional PEM fuel cells, stack connections are made between the fuel cell assemblies with conductive plates, having channels or grooves for gas distribution formed therein. A typical conventional fuel cell is comprised of an anode ($H_2$ or methanol side) current collector, anode backing, membrane electrode assembly (MEA) (anode/ion conducting membrane/cathode), cathode backing, and cathode current collector. Typical open circuit voltage under load for a direct methanol fuel cell is approximately in the range of 0.3–0.5 V To obtain higher voltages, fuel cells are typically stacked in series (bi-polar manner—positive to negative) one on top of another, or by connecting different cells in series in a planar arrangement. Conventional fuel cells can also be stacked in parallel (positive to positive) to obtain higher current, but generally, larger active areas are simply used instead.

During operation of a direct methanol fuel cell, a dilute aqueous methanol (usually 3–4% methanol) solution is used as the fuel on the anode side. If the methanol concentration is too high, then there is a methanol crossover problem that will reduce the efficiency of the fuel cell. If the methanol concentration is too low then there will not be enough fuel on the anode side for the fuel cell reaction to take place. Current DMFC designs are for larger stacks with forced airflow. The smaller air breathing DMFC designs are difficult to accomplish because of the complexity in miniaturizing all the required system components and integrating them in a small unit required for portable applications. Carrying the fuel in the form of a very dilute methanol mixture would require carrying a large quantity of fuel which is not practical for the design of a miniature power source for portable applications. Miniaturizing the DMFC system requires having on hand separate sources of methanol and water and mixing them in-situ for the fuel cell reaction. In addition, even distribution of the fuel onto the anode of the fuel cell is critical for optimum performance.

In the instance where a designated fuel flow is not present, the fuel flow will follow the path of least resistance to the fuel cell. This path of least resistance results in uneven distribution of the fuel to the anode. In addition, if an inefficient flow field is present, carbon dioxide by-products can accumulate in areas and prevent fuel from accessing the anode, or electrocatalyst. This results in back pressure which is formed due to the lack of means for exhausting of the carbon dioxide. To aid in supplying fuel, and more specifically methanol and water to the anode, it would be beneficial to form a fuel flow field that would provide for the even distribution of the fuel onto the anode, and more specifically onto the anode backing, and thus into the membrane electrode assembly (MEA). This provision for the equal distribution of the fuel would provide for optimum performance of the fuel cell device.

Accordingly, it is a purpose of the present invention to provide for a direct methanol fuel cell system design in which a fuel flow field is integrated into a miniaturized device.

It is a purpose of the present invention to provide for a direct methanol fuel cell including an integrated fuel flow field, comprised of microchannels, cavities, and microfluidics technology for the equal distribution of a fuel-bearing fluid to the anode of a fuel cell device.

It is still a further purpose of the present invention to provide for a direct methanol fuel cell including an integrated fuel flow field in which all of the system components are embedded inside a base portion, such as a ceramic base portion.

It is yet a further purpose of the present invention to provide for method of fabricating a direct methanol fuel cell including an integrated fuel flow field, comprised of microchannels, cavities, and microfluidics technology for the equal distribution of a fuel-bearing fluid to the anode of a fuel cell device.

SUMMARY OF THE INVENTION

The above problems and others are at least partially solved and the above purposes and others are realized in a fuel cell device and method of forming the fuel cell device including a base portion, formed of a singular body, and having a major surface. At least one membrane electrode assembly is formed on the major surface of the base portion. The base portion includes an integrated fuel flow field for the equal distribution of fuel to the membrane electrode assembly. A fluid supply channel is defined in the base portion and communicating with the fuel flow field and the at least one membrane electrode assembly for supplying a fuel-bearing fluid to the at least one membrane electrode assembly. An exhaust channel is defined in the base portion and communicating with the at least one membrane electrode assembly. The exhaust channel is spaced apart from the fluid supply channel for exhausting by-product fluid, including water, from the at least one membrane electrode assembly. The membrane electrode assembly and the cooperating fluid supply channel and cooperating exhaust channel forming a single fuel cell assembly.

BRIEF DESCRIPTION OF THE DRAWINGS

Referring to the drawings.

DESCRIPTION OF THE PREFERRED EMBODIMENT

In fuel cells, a flow field is typically machined or designed in an electrically conductive material, usually graphite or stainless steel. When forming a fuel cell on a ceramic substrate, the flow field can be designed and fabricated to include microchannels for fluidic communication and a conductive paste printed for current collection. Typically a serpentine pattern is the most common type used in graphite or stainless steel fuel cells. With multilayer ceramic technology, a serpentine pattern can be fabricated, but only to a certain frequency between the channels. When the channels become too close together, the processing becomes very difficult. In order to get the channels closer to each other (<40 mils) a three-dimensional pattern can be utilized.

Figure 1:
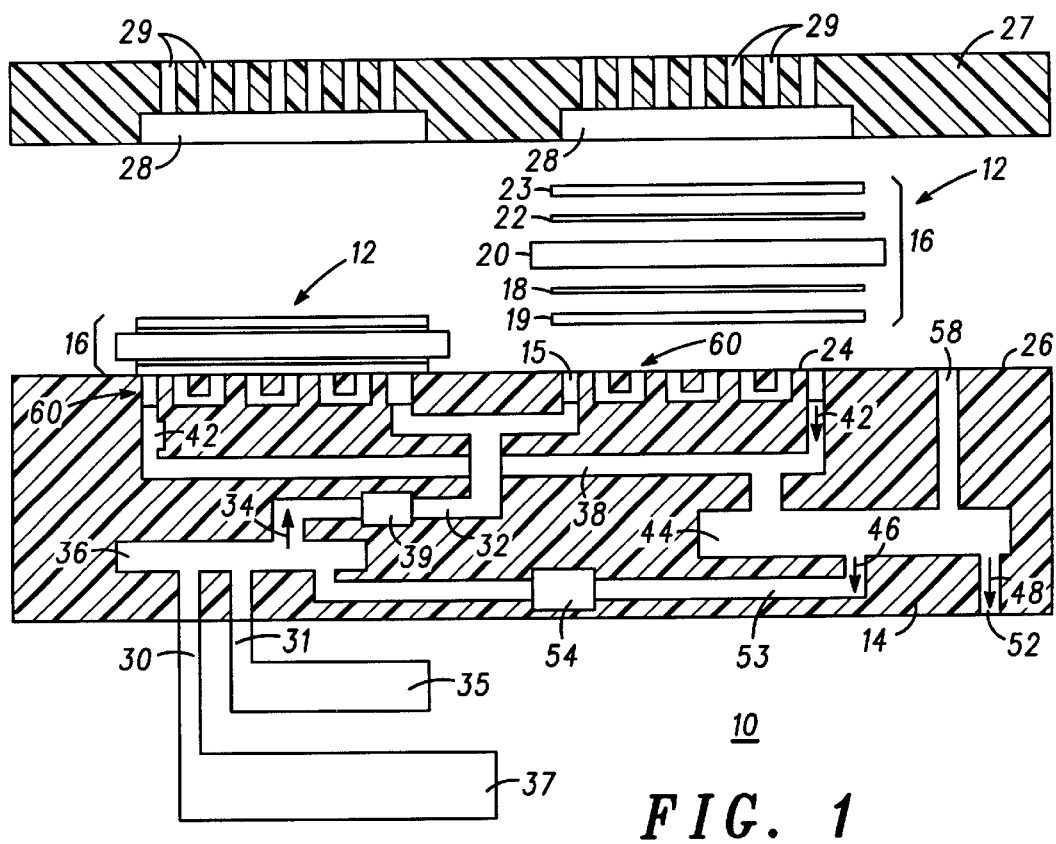
FIG. 1 is a simplified sectional view of a plurality of direct methanol fuel cell devices including an integrated fuel flow field formed on a single base portion including a plurality of microfluidic channels, according to the present invention.

Turning now to the drawings, FIG. 1 illustrates in simplified sectional view a direct methanol fuel cell including an integrated flow field fabricated according to the present invention. Illustrated is a fuel cell system, generally referenced 10, including a plurality of fuel cell assemblies 12. Fuel cell assemblies 12 are formed on a base portion. Base portion 14 is designed to be impermeable to the fuel and oxidizer materials that are utilized to power fuel cells 12. Typically a hydrogen-containing fuel is utilized to power fuel cells 12. Suitable fuels that are consumed by fuel cells 12 to produce electrical energy are hydrogen-containing materials such as hydrogen, methane and methanol. In this particular example, an aqueous solution of methanol is used as the fuel for fuel cells 12. Base portion 14 is typically formed of glass, plastic, silicon, graphite, ceramic, or any other suitable material. In this particular embodiment, planar stack 10 is composed of a plurality of direct methanol fuel cells 12 each defined by a fuel cell membrane electrode assembly (MEA) (discussed presently).

Base portion 14 has formed within a plurality of microfluidic channels as illustrated. More particularly, base portion 14 has formed a first fluid inlet 30 and a second fluid inlet 31, in fluidic communication with a fluid supply channel 32. Fluid supply channel 32 is formed in base portion 14 utilizing standard techniques, well known in the art, such as multi-layer ceramic technology, micromachining, or injection molding. Fluid supply channel 32 supplies a fuel-bearing fluid 34 to fuel cell 12. In this particular example, fuel-bearing fluid 34 is comprised of methanol and water being delivered directly from a methanol tank 35 and a water tank 37. A mixing chamber 36 is formed in base portion 14 in micro-fluidic communication with fluid supply channel 32 as illustrated. In a preferred embodiment, fuel-bearing fluid 34 is preferably 0.5%–4.0% methanol in water (99.5%–96.0%). The goal is to pump methanol into the overall assembly 10 at a rate of approximately 0.002 ml/min and pump the water into the assembly 10 at a rate of approximately 0.098 ml/min (2% to 98%). The fuel cell assembly 10 would also be able to use other fuels, such as hydrogen or ethanol, but it should be noted that ethanol is not as efficient, nor does it produce as much power as does the use of methanol. In this particular example, a separate methanol tank 35 and water tank 37 are utilized to supply the fuel-bearing fluid 34. The methanol will be pumped in at a given rate, and the water will be added as needed determined by the efficiency of the integrated water management system (discussed presently), which is monitored by a methanol concentration sensor 39. Methanol concentration sensor 39 helps maintain the methanol ratio in the mixture. The methanol and water will be homogeneously mixed in mixing chamber 36 before equally flowing to fuel cells 12.

In addition, there is formed in base portion 14, an exhaust channel 38 communicating with fuel cells 12. Exhaust channel 38 serves to remove exhaust products 42 from fuel cell 12, namely carbon dioxide and a water/methanol mixture. During operation, exhaust products are separated in a carbon dioxide separation chamber 44 into the water/methanol mixture 46 and a carbon dioxide gas 48. Next, gas 48 is expelled through an exhaust outlet 52, such as a gas permeable membrane and water/methanol mixture 46 is recirculated through a recirculating channel 53, having included as a part thereof a pump 54, such as a MEMs-type pump, or check valve type assembly, back to mixing chamber 36. In addition, in microfluidic communication is a water management system and a water recovery return channel 58. The water management system serves to recapture water from the cathode side of fuel cell 12, and direct it toward water recovery return channel 58, as illustrated. Water recovery return channel 58 is in micro-fluidic communication with separation chamber 44 and ultimately mixing chamber 36.

Management and recirculation of the water/methanol mixture, subsequent to reaction in fuel cell 12, and the recycling of the water diffused across the cathode, is required for miniaturizing the system. It is anticipated that the fuel delivery system includes methanol and water, in the form of methanol tank 35 and water tank 37, which is to be carried in portable disposable cartridge-like devices, connected through tubing to the base portion 14.

Fuel cell 12 is comprised of a fuel cell membrane electrode assembly 16 comprised of first electrode 18, or anode, including a carbon cloth backing 19, a film 20, such as a protonically conducting electrolyte membrane, and a second electrode 22, or cathode, including a carbon cloth backing 23. First and second electrodes 18 and 22 are comprised of any metal material, including those selected from the group consisting of platinum, palladium, gold, nickel, tungsten, ruthenium, molybdenum, osmium, iridium, copper, cobalt, iron, and alloys of platinum, palladium, gold, nickel, tungsten, molybdenum, osmium, iridium, copper, cobalt, iron, and ruthenium. Other components that may be contained in electrodes 18 and 22 are protonically conductive polymer, electrically conductive polymer, and inorganic supports such as carbon and metal oxides. Film 20 is further described as formed of a Nafion® type material that prevents the permeation of fuel from the anode side (first electrode 18) to the cathode side (second electrode 22) of each fuel cell 12.

Membrane electrode assemblies 16, in this particular example, are positioned in a recess 24 formed in an uppermost major surface 26 of a base portion 14. It is anticipated by this disclosure that membrane electrode assemblies 16 can be positioned on major surface 26 of base portion 14 without the need for the formation of recess 24. In this instance, a spacer (not shown) would be utilized to avoid complete compression of membrane electrode assembly 16. Base portion 14 further includes a current collector 15.

Planar stack array 10 further includes a top portion, more specifically, in this particular embodiment, a current collector 28, including a plurality of air flow-throughs 29 positioned to overlay membrane electrode assembly 16. Current collector 28 is formed as part of a cap portion, generally referenced 27. Cap portion 27 provides for the exposure of second electrode 22 to ambient air.

During fabrication, fuel cell membrane electrode assembly 16 is formed using a hot press method, or other standard method known in the art. More particularly, first electrode 18 is formed or positioned in contact with base portion 14. Various materials are suitable for the formation of electrode 18 as previously described. In this specific embodiment, and for exemplary purposes, first electrode 18 has a dimension of approximately 2.0 cm×2.0 cm.

Film 20, formed of a protonically conducting electrolyte, also referred to as a proton exchange membrane (PEM), is comprised of a Nafion® type material. Film 20 as previously stated serves to limit the permeation of fuel from the anode 18 of each fuel cell 12 to the cathode 22 of each fuel cells 12.

Next, during fabrication of membrane electrode assembly 16, a second electrode 22 is formed to be correspondingly cooperating with first electrode 18. Second electrode 22 is formed having approximately the same dimension as its corresponding first electrode 18. It should be understood, that as described, each fuel cell membrane electrode assembly 16 is comprised of first electrode 18, film 20, second electrode 22, and gas diffusion media layers, or more particularly carbon cloth backing layers, 19 and 23. Finally, current collector 28 is positioned relative to second electrode 22. Current collector 28 is formed at least 0.1 mm thick and of a length dependent upon a point of contact on each fuel cell 12. In the alternative, the plurality of fuel cells 12 can be electrically interfaced using silver conducting paint deposited by evaporation or sputtering. Materials suitable for this are gold (Au), silver (Au), titanium (Ti), copper (Cu), or any other low electrical resistant material. The bulk resistivity of the electrode material and area of the electrode will dictate the type of current collection scheme to minimize ohmic losses. It should be understood, that it is anticipated that fuel cells 12 can be electrically interfaced utilizing either a series connection or a parallel connection, dependent upon the desired resultant voltage. As illustrated in FIG. 1, further included in fuel cell device 10 is the integration of a three-dimensional flow field, generally referenced 60 (discussed presently).

In this particular embodiment, fuel cell array 10 has formed as a part thereof, four individual fuel cells 12, having an overall base portion 14 dimension of approximately 5.5 cm×5.5 cm×0.5 cm, and individual fuel cell 12 area of 4×1.5–2.0 cm squares. Each individual fuel cell 12 is capable of generating approximately 0.5 V and 22.5 mA/cm of power. Fuel cells 12 are formed on a base portion 14, each fuel cell 12 being spaced at least 0.5–1 mm apart from an adjacent fuel cell 12. It should be understood that dependent upon the required power output, any number of fuel cells 12 and any measurement of distance between fuel cells, can be fabricated to form a planar array of fuel cells, from one single fuel cell, to numerous fuel cells, as illustrated in FIG. 1.

Figure 2:
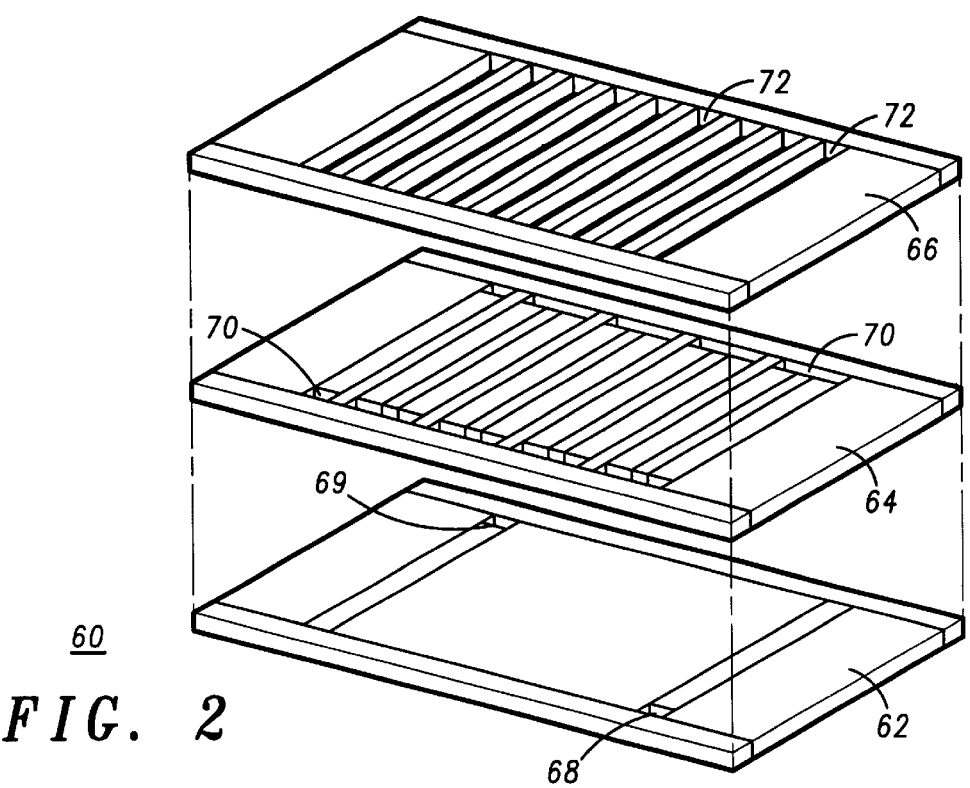
FIG. 2 is a simplified exploded orthogonal view of the flow field ceramic layers, according to the present invention.
Figure 3:
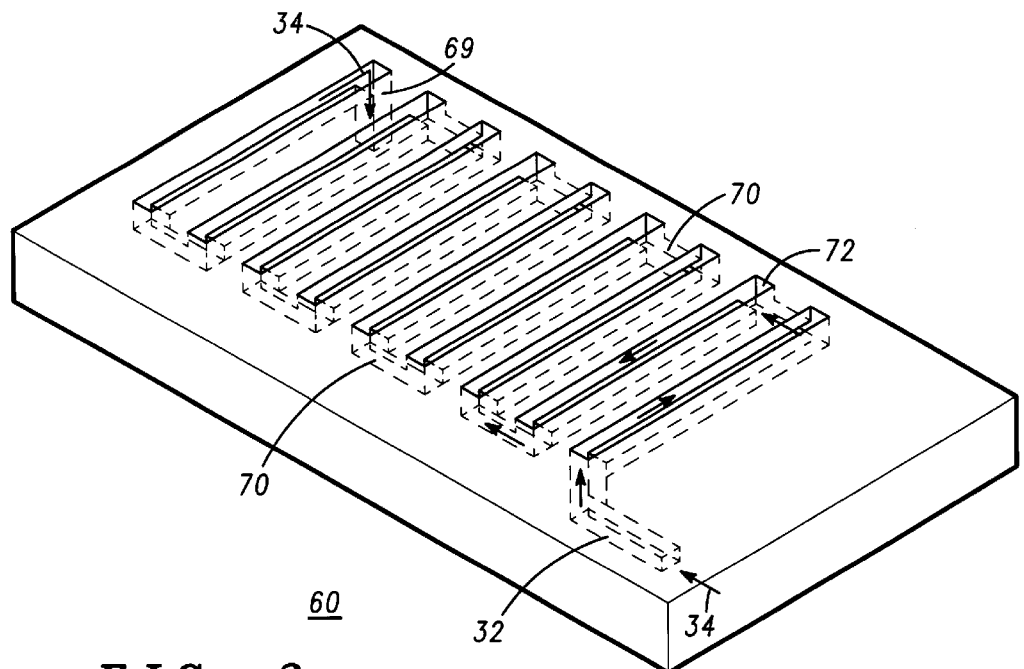
FIG. 3 is a simplified orthogonal view, illustrating the fuel flow field according to the present invention.

Referring now to FIGS. 2 and 3, illustrated in simplified orthogonal views, is three dimensional flow field 60 according to the present invention. Three-dimensional flow field 60 is comprised of a plurality of ceramic layers, generally referenced 62, 64, and 66, having formed therein a plurality of three-dimensional microfluidic fuel delivery channels (discussed presently). It should be understood that layers 62, 64, and 66 are included as a portion of the ceramic layers, that make up multi-layer ceramic fuel cell device 10 of the present invention and that additional layers where needed may be included to further define flow field 60.

As illustrated, a first ceramic layer 62 is formed having a fluid inlet 68 for the inlet of fuel 34 from fluid supply channel 32 and a fluid outlet 69 for the exhaust of spent fuel components to exhaust channel 38. Fuel inlet 68 and fuel outlet 69 are in fluidic communication with a ceramic layer 64, having formed therein a plurality of flow returns 70 (described presently) for the three-dimensional flow of fuel 34 through the multi-layers of ceramic. As illustrated, a third ceramic layer 66 includes a plurality of fuel delivery channels 72, further defining flow field 60. It is anticipated that fuel delivery channels 72 are fabricated having a separation between adjoining channels 72 of less than 1000 mils, and having a preferred spacing of approximately 40 mils between adjoining channels 72.

As illustrated in FIG. 3, during operation of fuel cells 12, the flow of fuel (as illustrated by arrows 34) follows flow field 60 along fuel delivery channels 72. At the end of each fuel delivery channel 72, the fuel flow 34 flows through a flow return 70, initially in a direction opposite adjacent electrode 18, as illustrated in FIG. 1. Fuel flow 34 flows within flow return 70 until it is returned up to the next fuel delivery channel 72. Fuel flow 34 is thus defined as flowing within the plurality of fuel delivery channels 72 in a single direction path as illustrated by arrows 34. This single direction path aids in the forcing out of carbon dioxide that is produced by electrode assembly 16 as an exhaust by-product. More specifically, during operation carbon dioxide produced at the electrode assembly 16 is forced back into flow field 60, or more particularly into fuel delivery channels 72. Due to the single direction path of fuel flow 34 within fuel delivery channels 72, this exhaust carbon dioxide is forced out of fuel delivery channels 72 through fuel outlet 69 toward exhaust channel 38.

The design of flow field 60 provides for the fabrication of a plurality of fuel delivery channels 72 in closer proximity to each other than has previously been realized. This in turn provides for enhanced fuel distribution to fuel cells 12, a diminished diffusion span of fuel 34 across gas diffusion layer 19, and provides for improved carbon dioxide removal as previously described. Fuel delivery channels 72 are fabricated sufficiently close to each other, more particularly, with less than 125 mils separation, and preferably with less than 40 mils separation between adjoining channels, so that fuel 34 is able to reach the entire surface of the adjacent anode 18 by diffusion through the gas diffusion layer, or more specifically carbon cloth, 19.

Figure 4:
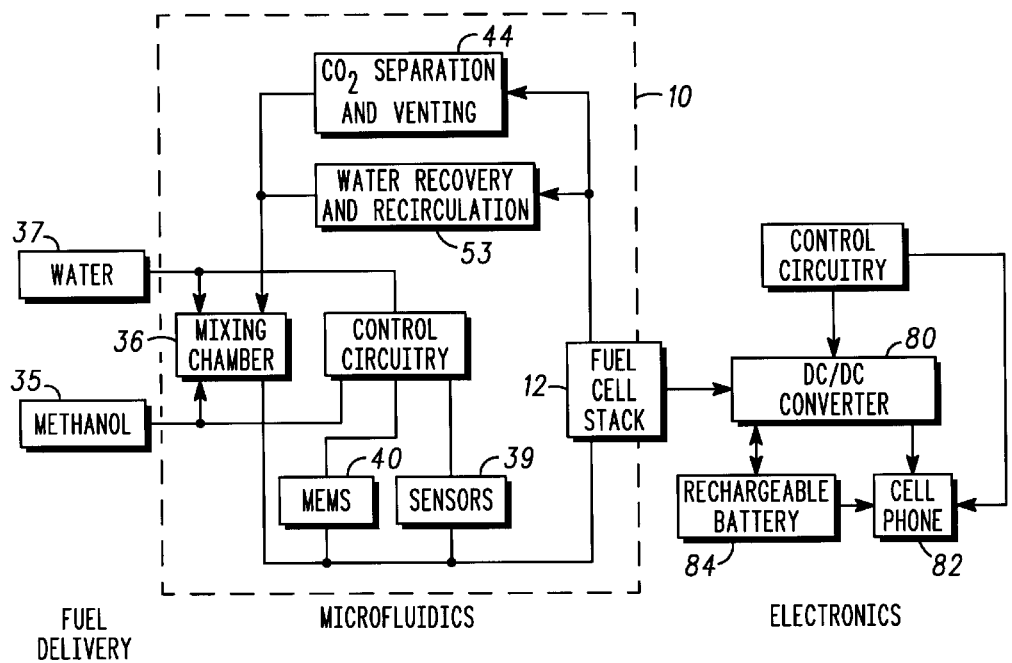
FIG. 4 is a simplified schematic diagram illustrating the fuel cell device an integrated fuel flow field of the present invention.

Referring now to FIG. 4, illustrated is a simplified schematic diagram detailing the system of the present invention. Illustrated are methanol tank 35 and water tank 37 in microfluidic communication with mixing chamber 36. Mixing chamber 36 as previously discussed serves to achieve the proper ratio of methanol to water. Once properly mixed, the fuel-bearing fluid flows through the fluid supply channel toward the fuel cell 12. An optional MEMs-type pump 40 is utilized to assist with this flow. Concentration sensors 39 are provided to assist with monitoring the methanol concentration, and the temperature of the fuel-bearing fluid. The fuel-bearing fluid next reaches fuel cell stack 12 and generates power. The power is supplied to a DC—DC converter 80 which converts the generated voltage to a useable voltage for powering a portable electronic device, such as a cell phone 82 and included as a part thereof a rechargeable battery 84. During operation spent fluid is exhausted through the exhaust channel toward a carbon dioxide separation chamber and carbon dioxide vent, generally referenced 44. In addition, water is recovered from the cathode side of the fuel cell 12, and from the separation chamber 44 and is recirculated through a recirculating channel back to the mixing chamber 36. This recirculating of fluid provides for the consumption of less water from water tank 37 and thus less replenishment of water tank 37.

Accordingly, disclosed is a fuel cell system including an integrated fuel flow field and method of fabrication which provides for the fabrication of the system, providing for inclusion of a single fuel cell or a plurality of fuel cells to be formed on a planar surface, thus allowing higher voltages and currents to be gained on a single planar surface. More particularly, the design provides for a simplified system in which fuel is delivered to the anode side of the electrode assembly through a three-dimensional fuel flow field, thus providing for even distribution to the anode and thus enhanced performance. In addition, it is disclosed that the system of the present invention is a semi-self contained system, and is not orientation sensitive, thus providing for ease in moving the system, such as when providing power to a portable electronic device.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A fuel cell device comprising:
    a base portion, formed of a singular body, and having a major surface;
    at least one fuel cell membrane electrode assembly formed on the major surface of the base portion;
    a fluid supply channel defined in the base portion and communicating with the at least one fuel cell membrane electrode assembly, the fluid supply channel including a mixing chamber and at least one fuel-bearing fluid inlet;
    an exhaust channel defined in the base portion and communicating with the at least one fuel cell membrane electrode assembly, the exhaust channel including a water recovery and recirculation channel for the recovery and recirculation of a spent fuel-bearing fluid and a reaction water, the exhaust channel spaced apart from the fluid supply channel for exhausting fluid from the at least one fuel cell membrane electrode assembly, the at least one fuel cell membrane electrode assembly and the cooperating fluid supply channel and cooperating exhaust channel forming a single fuel cell assembly;
    a multi-dimensional fuel flow field defined in the base portion and communicating with the fluid supply channel, the at least one fuel cell membrane electrode assembly, and the exhaust channel, the multi-dimensional fuel flow field including a plurality of fuel flow returns, thereby providing for the three-dimensional flow of fuel within the base portion to the fuel cell membrane electrode assembly; and
    a plurality of electrical components formed in the base portion for electrical integration of the fuel cell assembly.

2. A fuel cell device as claimed in claim 1 wherein the base portion comprises a material selected from the group consisting of ceramic, plastic, glass, graphite, and silicon.

3. A fuel cell device as claimed in claim 2 wherein the at least one fuel cell membrane electrode assembly formed on the major surface of the base portion includes a plurality of fuel cell membrane electrode assemblies formed on the major surface of the base portion.

4. A fuel cell device as claimed in claim 1 wherein the fuel cell membrane electrode assembly further includes a carbon cloth backing positioned on a first electrode on a side opposite the adjacent film, and a carbon cloth backing positioned on a second electrode on a side opposite the adjacent film.

5. A fuel cell device as claimed in claim 1 wherein the multi-dimensional fuel flow field further includes a plurality of fuel delivery channels in communication with the plurality of fuel flow returns.

6. A fuel cell device as claimed in claim 5 wherein the plurality of fuel delivery channels are formed having a separation of less than 1000 mils between adjoining fuel delivery channels.

7. A fuel cell device as claimed in claim 1 wherein the multi-dimensional fuel flow field includes a fuel inlet in fluidic communication with the fluid supply channel and a fuel outlet in fluidic communication with the exhaust channel.

8. A fuel cell device comprising:
    a base portion, formed of a singular body, and having a major surface, the base portion formed of a material selected from the group consisting of ceramic, plastic, glass, and silicon;
    at least one fuel cell membrane electrode assembly formed on the major surface of the base portion, the at least one fuel cell membrane electrode assembly including a first electrode, a film formed of a protonically conductive electrolyte, and a second electrode;
    a fluid supply channel defined in the base portion and communicating with the at least one fuel cell membrane electrode assembly for supplying a fuel-bearing fluid to the at least one fuel cell membrane electrode assembly, the fluid supply channel further including a first fuel-bearing fluid inlet, and a second fuel-bearing fluid inlet, and a mixing chamber;
    an exhaust channel defined in the base portion and communicating with the at least one fuel cell membrane electrode assembly, the exhaust channel spaced apart from the fluid supply channel for exhausting fluid from the at least one spaced apart fuel cell membrane electrode assembly, the exhaust channel further including a water recovery and recirculation channel in fluidic communication with the at least one fuel cell membrane electrode assembly;
    a multi-dimensional fuel flow field defined in the base portion and communicating with the fluid supply channel, the multi-dimensional fuel flow field including a plurality of fuel flow returns, thereby providing for the three-dimensional flow of fuel within the base portion to the fuel cell membrane electrode assembly, the at least one fuel cell membrane electrode assembly, the exhaust channel, the multi-dimensional fuel flow field, the cooperating fluid supply channel, and the cooperating exhaust channel in combination forming a single fuel cell assembly; and a top portion including a plurality of electrical components for electrical integration of the plurality of formed fuel cell assemblies.

9. A fuel cell device as claimed in claim 8 further including a plurality of spaced apart fuel cell membrane electrode assemblies formed on the major surface of the base portion, thereby forming a plurality of fuel cell assemblies.

10. A fuel cell device as claimed in claim 9 wherein the plurality of fuel cell membrane electrode assemblies are electrically connected in one of a series electrical interface or a parallel electrical interface.

11. A fuel cell device as claimed in claim 10 wherein the fluid supply channel defined in the base portion and the exhaust channel defined in the base portion are formed to equally and simultaneously communicate with each of the plurality of spaced apart fuel cell membrane electrode assemblies.

12. A fuel cell device as claimed in claim 8 wherein the multi-dimensional fuel flow field further includes a plurality of fuel delivery channels in communication with the plurality of fuel flow returns.

13. A fuel cell device as claimed in claim 12 wherein the plurality of fuel delivery channels are formed having a separation of less than 1000 mils between adjoining fuel delivery channels.

14. A fuel cell device as claimed in claim 13 wherein the first and second electrodes comprise a material selected from the group consisting of platinum, palladium, gold, nickel, tungsten, molybdenum, ruthenium, osmium, iridium, copper, cobalt, iron, and alloys of platinum, palladium, gold, nickel, tungsten carbide, molybdenum, osmium, iridium, copper, cobalt, iron, and ruthenium.

15. A method of fabricating a fuel cell device comprising the steps of:

providing a multi-layer base portion formed of a material selected from the group consisting of ceramic, plastic, glass, graphite, and silicon;

forming a fluid supply channel in the base portion for supplying a fuel-bearing fluid to at least one fuel cell membrane electrode assembly, the fluid supply channel further including a mixing chamber and a methanol concentration sensor;

forming an exhaust channel in the base portion, the exhaust channel spaced apart from the fluid supply channel for exhausting fluid from the at least one spaced apart fuel cell membrane electrode assembly, the exhaust channel further including a water recovery and recirculation channel for the recovery and recirculation of a spent fuel-bearing fluid and a reaction water;

forming the at least one fuel cell membrane electrode assembly on the major surface of the base portion, the step of forming the at least one spaced apart fuel cell membrane electrode assembly including the steps of providing for a first electrode on a major surface of the base portion, and providing for a film formed of a protonically conductive electrolyte in contact with the first electrode, providing for a second electrode in contact with the film, the at least one spaced apart fuel cell membrane electrode assembly and the cooperating fluid supply channel and cooperating exhaust channel forming a single fuel cell assembly;

forming a multi-dimensional integrated fuel flow field in communication with the fluid supply channel, the exhaust channel and the at least one fuel cell membrane electrode assembly, the step of forming the multi-dimensional integrated fuel flow field includes forming a plurality of fuel delivery channels in communication with a plurality of fuel flow returns in multiple layers of the multi-layer base portion, thereby defining a three-dimensional fuel flow field; and forming a top portion including a plurality of electrical components for electrical integration of the formed fuel cell assembly.

16. A method of fabricating a fuel cell device as claimed in claim 15 wherein the step of forming the at least one fuel cell membrane electrode assembly on the major surface of the base portion includes the step of forming a plurality of fuel cell membrane electrode assemblies.

17. A method of fabricating a fuel cell device as claimed in claim 15 wherein the step of electrically interfacing the plurality of fuel cell assemblies includes one of the steps of electrically connecting each of the second electrodes to an adjacent first electrode, thus connecting the plurality of fuel cells in series electrically to increase the output voltage of the structure or electrically connecting each of the first electrodes to an adjacent first electrode and connecting each of the second electrodes to an adjacent second electrode, thus connected in parallel electrically to increase the output current.

18. A method of fabricating a fuel cell device as claimed in claim 15 wherein the step of forming a plurality of fuel delivery channels includes forming the plurality of fuel delivery channels in the multi-layer base portion having a separation of less than 1000 mils between adjoining fuel delivery channels.

* * * * *